(12) United States Patent
Matsuda et al.

(10) Patent No.: US 10,604,638 B2
(45) Date of Patent: Mar. 31, 2020

(54) FLAME RETARDANT COMPOSITION

(71) Applicant: CANON KABUSHIKI KAISHA, Tokyo (JP)

(72) Inventors: Katsuhiro Matsuda, Kawasaki (JP); Toshinari Miura, Kawasaki (JP); Takeshi Komuro, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 15/038,699

(22) PCT Filed: Nov. 14, 2014

(86) PCT No.: PCT/JP2014/081482
§ 371 (c)(1),
(2) Date: May 23, 2016

(87) PCT Pub. No.: WO2015/080235
PCT Pub. Date: Jun. 4, 2015

(65) Prior Publication Data
US 2016/0289425 A1    Oct. 6, 2016

(30) Foreign Application Priority Data

Nov. 26, 2013  (JP) .................. 2013-244242

(51) Int. Cl.
*C08K 5/523*     (2006.01)
*G03G 21/16*     (2006.01)
(Continued)

(52) U.S. Cl.
CPC ......... *C08K 5/523* (2013.01); *G03G 21/1619* (2013.01); *B29C 45/00* (2013.01);
(Continued)

(58) Field of Classification Search
None
See application file for complete search history.

(56) References Cited

U.S. PATENT DOCUMENTS 4,125,323 A * 11/1978 Ikeda .................. G03G 15/041
                                                    355/60
5,677,096 A * 10/1997 Suzuki ................ G03G 5/0696
                                                    430/58.65
(Continued)

FOREIGN PATENT DOCUMENTS

EP    0 595 597 A *  5/1994
JP    3-166258 A     7/1991
(Continued)

*Primary Examiner* — Vivian Chen
(74) *Attorney, Agent, or Firm* — Canon USA, Inc., IP Division

(57) ABSTRACT

Provided is a flame retardant composition containing a flame retardant compound and a polymer containing styrene or aromatic polyester represented by General Formula (1)

(Continued)

where $R_1$ to $R_3$ in General Formula (1) represent substituents.

16 Claims, 2 Drawing Sheets

(51) Int. Cl.
| | |
|---|---|
| *G03G 15/00* | (2006.01) |
| *B32B 27/30* | (2006.01) |
| *C08K 5/00* | (2006.01) |
| *B32B 27/36* | (2006.01) |
| *C08K 5/52* | (2006.01) |
| *C08K 5/521* | (2006.01) |
| *C08K 5/49* | (2006.01) |
| *C08L 67/02* | (2006.01) |
| *B29C 45/00* | (2006.01) |
| *B29K 55/02* | (2006.01) |
| *B29C 48/00* | (2019.01) |
| *B29K 67/00* | (2006.01) |
| *B29K 105/00* | (2006.01) |

(52) U.S. Cl.
CPC .......... *B29C 45/0001* (2013.01); *B29C 48/00* (2019.02); *B29C 48/022* (2019.02); *B29K 2055/02* (2013.01); *B29K 2067/00* (2013.01); *B29K 2105/0026* (2013.01); *B32B 27/30* (2013.01); *B32B 27/302* (2013.01); *B32B 27/36* (2013.01); *B32B 2307/3065* (2013.01); *B32B 2355/02* (2013.01); *B32B 2367/00* (2013.01); *B32B 2457/00* (2013.01); *C08K 5/00* (2013.01); *C08K 5/0066* (2013.01); *C08K 5/49* (2013.01); *C08K 5/52* (2013.01); *C08K 5/521* (2013.01); *C08K 2201/00* (2013.01); *C08L 67/02* (2013.01); *C08L 2207/20* (2013.01); *G03G 15/00* (2013.01); *G03G 21/16* (2013.01); *G03G 21/1661* (2013.01); *G03G 21/1666* (2013.01); *G03G 21/1671* (2013.01); *G03G 2215/00* (2013.01)

(56) References Cited

U.S. PATENT DOCUMENTS

| | | | | | |
|---|---|---|---|---|---|
| 5,759,725 | A * | 6/1998 | Hirao | ............... | B82Y 10/00 430/130 |
| 5,837,757 | A * | 11/1998 | Nodera | ............... | C08K 3/22 524/141 |
| 6,331,371 | B1 * | 12/2001 | Matsui | ............... | G03G 5/00 430/131 |
| 6,369,142 | B1 * | 4/2002 | Nodera | ............... | C08K 5/1515 524/109 |
| 6,465,555 | B1 * | 10/2002 | Nodera | ............... | C08K 3/02 524/111 |
| 9,657,171 | B2 * | 5/2017 | Matsuda | ............... | C08L 69/00 |
| 2002/0016392 | A1 * | 2/2002 | Nodera | ............... | C08K 5/103 524/311 |
| 2003/0058325 | A1 * | 3/2003 | Fukui | ............... | G03G 15/326 347/133 |
| 2003/0162870 | A1 * | 8/2003 | Kimura | ............... | C08K 5/523 524/127 |
| 2003/0195281 | A1 * | 10/2003 | Janke | ............... | C07F 9/12 524/115 |
| 2004/0012003 | A1 * | 1/2004 | Tabushi | ............... | C08K 5/521 252/601 |
| 2004/0152808 | A1 * | 8/2004 | Tezuka | ............... | C08F 257/02 524/127 |
| 2004/0254270 | A1 * | 12/2004 | Harashina | ............... | C08K 3/24 524/86 |
| 2005/0014003 | A1 * | 1/2005 | Takei | ............... | C08F 14/26 428/407 |
| 2006/0142438 | A1 * | 6/2006 | Ishii | ............... | C08L 67/02 524/100 |
| 2007/0232742 | A1 * | 10/2007 | Maehara | ............... | C08K 9/04 524/445 |
| 2010/0076133 | A1 * | 3/2010 | Yamaguchi | ............... | C08K 3/34 524/188 |
| 2011/0021740 | A1 * | 1/2011 | Van Benthem | ............... | C07D 307/48 528/249 |
| 2011/0124839 | A1 * | 5/2011 | Matsuda | ............... | C08G 63/6926 528/365 |
| 2011/0130498 | A1 * | 6/2011 | Shinagawa | ............... | C08L 67/02 524/136 |
| 2012/0052281 | A1 * | 3/2012 | Ishiguro | ............... | B29C 43/003 428/220 |
| 2012/0184662 | A1 * | 7/2012 | van der Mee | ............... | C08L 67/02 524/451 |
| 2016/0068553 | A1 * | 3/2016 | Matsuda | ............... | C07F 9/12 524/145 |
| 2016/0083579 | A1 * | 3/2016 | Matsuda | ............... | C08L 69/00 399/159 |
| 2016/0289425 | A1 * | 10/2016 | Matsuda | ............... | C08K 5/523 |
| 2016/0369093 | A1 * | 12/2016 | Komuro | ............... | G03G 21/1619 |
| 2017/0158841 | A1 * | 6/2017 | Matsuda | ............... | C08K 5/523 |

FOREIGN PATENT DOCUMENTS

| | | | |
|---|---|---|---|
| JP | 10-338802 | A | 12/1998 |
| JP | 11-080381 | A | 3/1999 |
| JP | 11-080568 | A * | 3/1999 |
| JP | 2000-169692 | A | 6/2000 |
| JP | 2001-026709 | A * | 1/2001 |
| JP | 2002-348575 | A | 12/2002 |
| JP | 2006-77215 | A | 3/2006 |
| JP | 2008-024890 | A * | 2/2008 |
| JP | 2009-1747 | A | 1/2009 |
| JP | 2013-541599 | A | 11/2013 |
| WO | 2011/122464 | A1 | 10/2011 |
| WO | 2014/171122 | A1 | 10/2014 |
| WO | 2014/185066 | A1 | 11/2014 |

* cited by examiner

FLAME RETARDANT COMPOSITION

CROSS-REFERENCE TO RELATED APPLICATIONS

This application is a National Stage filing of International Application No. PCT/JP2014/081482 filed Nov. 14, 2014, which claims the benefit of Japanese Patent Application No. 2013-244242, filed Nov. 26, 2013, the disclosures of each of which are hereby incorporated by reference herein in their entirety.

TECHNICAL FIELD

The present invention relates to a flame retardant composition containing a polymer containing styrene or aromatic polyester.

BACKGROUND ART

Heretofore, resin for use in electronic parts is imparted with flame retardancy by a flame retardant according to the intended use and a part for which the resin is used. Known as the flame retardant are bromine-based flame retardants, phosphorus-based flame retardants, inorganic flame retardants, silicone-based flame retardants, and the like. The phosphorus-based flame retardant is kneaded with the resin containing a polymer containing styrene or aromatic polyester frequently used in copying machines and the resin is imparted with flame retardancy of V-2 to V-0 in the UL94 standard for the flame retardancy of resin materials according to the intended use.

On the other hand, a biomass-derived resin obtained from plants has drawn attention from the viewpoint of reducing the consumption amount of petroleum resources, and polylactic acid containing starch, such as corn, as the raw material is known. The biomass-derived resin, whose strength and flame retardancy are improved by an alloy with a petroleum-derived resin or an additive, is practically used for cases of copying machines and the like.

However, for the flame retardant, petroleum-derived resources are still used. Therefore, a development of a flame retardant utilizing renewable resources, such as plants, has been demanded from the above-described viewpoint.

As those obtained from plants among flame retardants which impart flame retardancy to resin, tannin is described in PTL 1 (Japanese Patent Laid-Open No. 2006-77215), potassium hydrogen tartrate is described in PTL 2 (Japanese Patent Laid-Open No. 2002-348575), and phytic acid is described in PTL 3 (Japanese Patent Laid-Open No. 2009-1747).

Known as flame retardant compounds obtained from plants are tannin, potassium hydrogen tartrate, phytic acid, and the like. However, when the compounds are added to the polymer containing styrene or the aromatic polyester, a composition having high flame retardancy cannot be obtained.

This is considered to be because tannin, potassium hydrogen tartrate, and phytic acid are hydrophilic, and therefore have low compatibility with resin.

CITATION LIST

Patent Literature

PTL 1 Japanese Patent Laid-Open No. 2006-77215
PTL 2 Japanese Patent Laid-Open No. 2002-348575
PTL 3 Japanese Patent Laid-Open No. 2009-1747

SUMMARY OF INVENTION

Then, it is an object of the present invention to provide a flame retardant composition which is synthesized from plants, contains a flame retardant compound having high compatibility with resin, and has flame retardancy higher than that of a composition containing a former flame retardant compound.

The present invention provides a flame retardant composition containing a flame retardant compound represented by General Formula (1) shown below and a polymer containing styrene or aromatic polyester, in which the content of the flame retardant compound is 7 wt % or more and 15 wt % or less when the total weight of the flame retardant compound and the polymer containing styrene or the aromatic polyester is 100 wt %.

[Chem. 1]

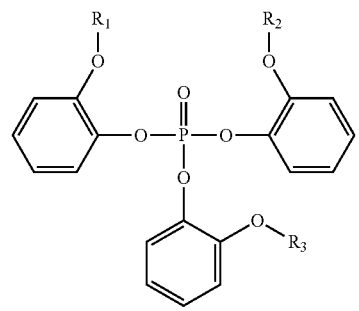

(1)

In General Formula (1), $R_1$ to $R_3$ are alkyl groups. $R_1$ to $R_3$ each may be the same or different from each other.

Further features of the present invention will become apparent from the following description of exemplary embodiments with reference to the attached drawing.

DESCRIPTION OF EMBODIMENT

Figure 1A:
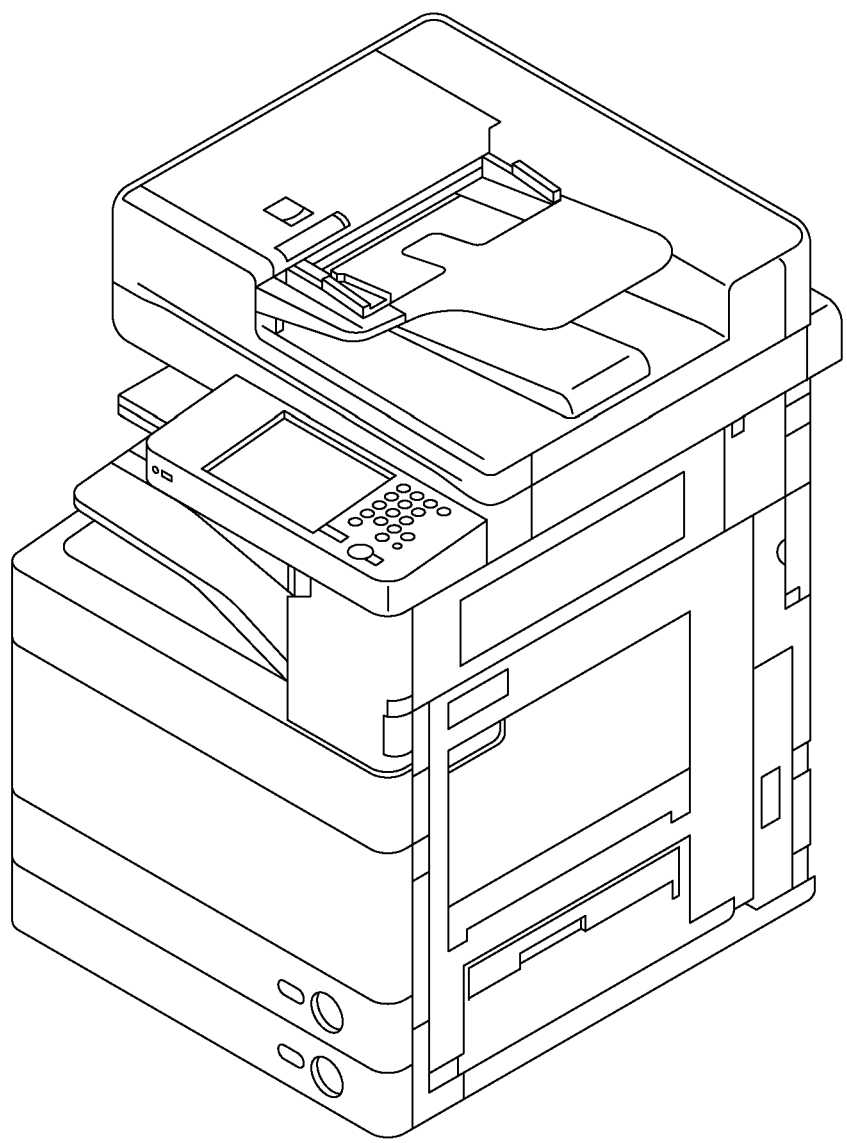
FIG. 1A illustrates an outside view of an example of an image formation apparatus according to this embodiment.

A flame retardant compound contained in a flame retardant composition according to the present invention is a compound represented by General Formula (1) shown below. In this embodiment, the flame retardant compound represented by General Formula (1) is sometimes referred to as a flame retardant.

[Chem. 1]

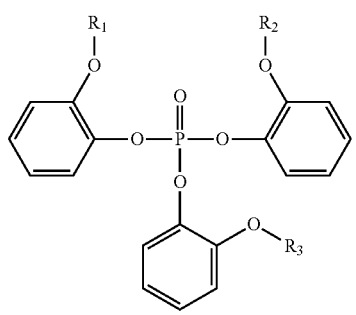

(1)

In General Formula (1), $R_1$ to $R_3$ are alkyl groups. $R_1$ to $R_3$ each may be the same or different from each other. With respect to the alkyl group, the number of carbon atoms is not particularly limited and the number of carbon atoms is preferably 1 or more and 8 or less and more preferably 1 or more and 4 or less. $R_1$ to $R_3$ are particularly suitably all methyl groups.

The flame retardant compound according to the present invention has high flame retardancy and does not have a hydroxyl group and has an alkyl group in the structure, and thus is lipophilic. Therefore, the flame retardant compound is likely to dissolve in a resin containing a polymer containing styrene or aromatic polyester. As a result, even when the flame retardant compound is added to the resin, the flame retardant compound can develop high flame retardancy.

On the other hand, tannin is hydrophilic because tannin has a hydroxyl group which is hydrophilic in the structure, and therefore has low solubility in resin. Potassium hydrogen tartrate and phytic acid are used in the form of a salt, and therefore the solubility thereof in resin is low. As a result, when added to resin, a composition having high flame retardancy cannot be obtained.

The flame retardant compound according to the present invention can demonstrate high flame retardancy when added to the resin containing a polymer containing styrene or aromatic polyester.

The flame retardant compound according to the present invention can be produced by a method described below, for example.

The flame retardant compound according to the present invention is obtained by esterifying guaiacol obtained from plants and phosphorus oxychloride in the presence of a base or a catalyst as shown in Reaction Formula (2) shown below. As the etherifying method, known methods can be used. The right side of Reaction Formula (2) shows that the flame retardant compound according to the present invention and HCl are obtained.

[Chem. 2]

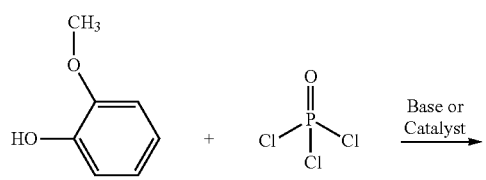

(2)

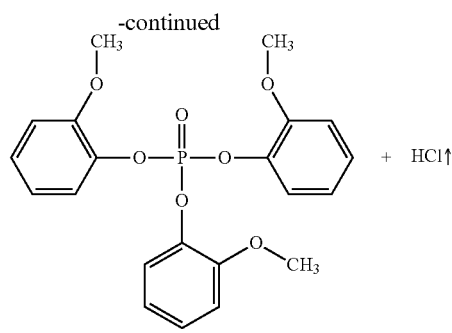

+ HCl↑

In the description above, a method for producing a compound represented by Structural Formula (1) shown below is described as an example. By selecting a substituent and a start substance as appropriate, the flame retardant according to the present invention can be produced.

[Chem. 3]

Structural Formula (1)

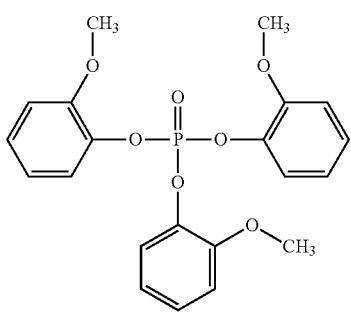

Moreover, in order to proceed the etherification in Formula (2), a base or a catalyst can be made to coexist. The base traps hydrogen chloride to be by-produced to form a hydrochloric acid salt of the base which is made to coexist. Therefore, there is an effect that the equilibrium of the etherification can be shifted to the reaction product side, so that the reaction speed is increased to improve the yield.

As such a base, tertiary amines, such as triethylamine and pyridine, and alkali metal hydroxides are suitable because the yield of phosphoric acid ester is high. When primary amines or secondary amines are used, phosphoric acid amide is generated in addition to phosphoric acid ester, and therefore the yield of phosphoric acid ester is low. Examples of another method for improving the reaction efficiency include a method of making Lewis acid, such as magnesium chloride, coexist, and then performing heating to proceed the reaction.

A reaction mixture obtained by the reaction can be purified by a known isolation method. The purification is suitable because the remaining amount of an unreacted substance, a catalyst, and the like becomes small. Specifically, the remaining amount of an unreacted substance, a catalyst, and the like is particularly suitably 1 wt % or less. When the remaining amount of an unreacted substance, a catalyst, and the like is large, the flame retardancy decreases and, when kneading resin, the resin is deteriorated, which may be a cause of reducing the physical properties. As the isolation method, filtration, washing, drying, and the like are used.

The melting point measured by a differential scanning calorimetry (DSC) of the flame retardant represented by Structural Formula (1) of the present invention is 99° C. and the 5% weight loss temperature measured by a thermogravimetric analyzer (TGA) is 249° C. These values show that the flame retardant has heat characteristics which allow the flame retardant to sufficiently stand the kneading of resin, such as the polymer containing styrene or the aromatic polyester.

Guaiacol for use in the flame retardant compound according to the present invention is suitably one synthesized from plants from the viewpoint of a reduction in the consumption amount of petroleum resources. The guaiacol synthesized from plants can be obtained by known methods, such as distilling pyroligneous acid generated when producing charcoal from beech, guaiacum wood, and the like. When obtaining the guaiacol from plants, $R_1$ to $R_3$ in General Formula (1) are suitably all methyl groups. It is a matter of course that one obtained by chemical synthesis can be used as guaiacol.

As an example of synthesizing the flame retardant compound in this embodiment, a chloride of phosphorus is mentioned as the compound to be reacted with guaiacol for etherification. However, the flame retardant compound containing guaiacol can also be obtained by reacting a chloride of a phosphorus-nitrogen compound, such as cyclic phosphonitrile dichloride, or a chloride of a nitrogen compound, such as trichloro-1,3,5-triazine, with guaiacol.

Among the above, the chloride of a phosphorus-nitrogen compound and the chloride of phosphorus are suitable and the chloride of phosphorus is particularly suitable. These reactions can be performed similarly as in the reaction of guaiacol and phosphorous oxychloride which is the chloride of phosphorus.

A reactant of cyclic phosphonitrile dichloride and guaiacol is cyclic phosphonitrile phosphoric acid ester.

A reactant of trichloro-1,3,5-triazine and guaiacol is tris(methoxyphenoxy)-1,3,5-triazine.

Hereinafter, the flame retardant resin composition of the present invention is described.

The weight of the flame retardant compound of the flame retardant composition of the present invention is suitably 7 wt % or more and 15 wt % or less when the total weight of the flame retardant compound and the polymer containing styrene or the aromatic polyester is 100 wt %. This is because when the weight is less than 7 wt %, the flame retardant effect becomes low and when the weight exceeds 15 wt %, the strength becomes low.

The polymer containing styrene contained in the flame retardant composition according to the present invention is a compound containing styrene as a monomer or a compound containing a styrene derivative as a monomer. These compounds can contain phenylethylene in the structure.

Specifically, ABS which is a polymer obtained by polymerizing acrylonitrile, butadiene, and styrene is mentioned. ABS is a polymer containing acrylonitrile, butadiene, and styrene as the structural units. The description "containing as the structural unit" means containing the compound as a monomer.

The polymer containing styrene may be a random polymer, a block polymer, or a core shell type polymer.

The aromatic polyester contained in the flame retardant composition according to the present invention is suitably polyalkylene furan dicarboxylate and particularly suitably polyethylene furan dicarboxylate represented by Structural Formula (2) shown below.

[Chem. 4]

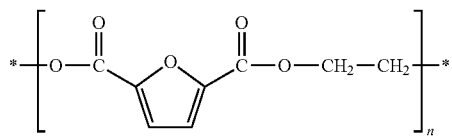

Structural formula (2)

Herein, n is an integer and is suitably 185 or more and 600 or less. The case where n is 185 or more is suitable because the strength of the flame retardant composition is high. The case where n is 600 or less is suitable because it is easy to mold the same. This polymerization degree range is similarly a suitable range also in polyalkylene furan dicarboxylate. In Structural Formula (2), * indicates a position where repeating units are bonded to each other. The terminal of the polymer is a hydrogen atom or a hydroxyl group.

The weight of the polymer containing styrene or the aromatic polyester contained in the flame retardant composition of the present invention is suitably 85 wt % or more and 93 wt % or less when the total weight of the flame retardant compound and the polymer containing styrene or the aromatic polyester is 100 wt %.

When the weight is less than 85 wt %, the strength of the flame retardant composition becomes low. When the weight exceeds 93 wt %, the flame retardancy of the flame retardant composition cannot be achieved. Specifically, in a burning test according to the UL94 standard, the burning time is prolonged and the flame retardancy in the UL94 standard required in each of the polymer containing styrene or the aromatic polyester when used for members of copying machines cannot be satisfied.

Herein, the flame retardancy in the UL94 standard required in each of the polymer containing styrene or the aromatic polyester when used for members of copying machines is V-2 in the polymer containing styrene and is V-0 in the aromatic polyester.

Due to the fact that a specific amount of the flame retardant compound according to the present invention is contained, V-2 can be achieved in the polymer containing styrene, such as ABS. Moreover, V-0 can be achieved in the aromatic polyester, such as PAF.

The flame retardant composition according to the present invention may further contain a compound containing fluorine. Specifically, as the compound containing fluorine, a compound containing polytetrafluoroethylene (PTFE) is mentioned.

The content of the compound containing fluorine contained in the flame retardant composition of this embodiment is suitably 0.1 wt % or more and 1 wt % or less when the weight of the entire composition is 100 wt %.

The case where the weight is 0.1 wt % or more and 1 wt % or less is suitable because, when a flame is brought close to a burning test piece, the resin is difficult to melt and drip from the test piece.

When influence on the environment is taken into consideration, the weight of fluorine contained in the composition is suitably 0.5 wt % or less when the weight of the entire flame retardant composition of this embodiment is 100 wt %.

For example, when the compound containing fluorine comprises a compound including 50% by weight of fluorine, the addition amount of the compound containing fluorine is suitably set to 1 wt % or less when the weight of the entire flame retardant composition is 100 wt %.

In a method for producing the flame retardant composition according to the present invention, the addition amount of the flame retardant compound is an addition amount of 7 wt % or more and 15 wt % or less when the total weight of the flame retardant compound and the polymer containing styrene or the aromatic polyester is 100 wt %.

More specifically, the addition amount of the polymer containing styrene or the aromatic polyester is an addition amount of 85 wt % or more and 93 wt % or less when the total weight of the flame retardant compound and the polymer containing styrene or the aromatic polyester is 100 wt %.

With respect to the weight ratio of the flame retardant composition according to this embodiment, the charge amount ratio can also be regarded to be the composition ratio of the composition. Moreover, the composition ratio of the composition can also be measured by measuring NMR or IR.

To the flame retardant composition of this embodiment, a pigment, a heat stabilizer, an antioxidant, an inorganic filler, a plant fiber, a weather resistant agent, a lubricant, a mold release agent, an antistatic agent, and the like can be further added insofar as the properties are not considerably impaired.

A molded body containing the flame retardant composition of the present invention can be molded into a desired shape. A molding method is not particularly limited and extrusion molding, injection molding, and the like can be used as an example.

The polymer containing styrene or the aromatic polyester contained in the flame retardant composition according to this embodiment may be a recovered resin. When using the recovered resin, the flame retardant composition can be referred to as a recycled resin. When producing the recycled resin, the flame retardant compound according to the present invention may be added to a prepared resin.

Examples of the recovered resin include resin used for cases of image formation apparatuses, resin used for camera parts, resin used for cases and internal parts of personal computers, cases and internal parts of televisions, and water bottles.

The molded body according to this embodiment can be obtained by molding a prepared composition containing the flame retardant compound according to the present invention. For the molding, known techniques, such as extrusion molding and injection molding, can be used.

The molded body of this embodiment can be used for cases or internal parts of image formation apparatuses, such as copying machines, laser beam printers (LBPs), and ink jet printers, toner cartridge parts of copying machines and laser beam printers, cases and internal parts of facsimiles, camera parts, cases and internal parts of personal computers, cases and internal parts of televisions, and the like.

The image formation apparatus according to this embodiment is an electrophotographic image formation apparatus having a light source and a photoconductor and has a case for accommodating the photoconductor, in which the flame retardant composition according to the present invention is contained in the case.

The molded body according to this embodiment can be used for parts requiring flame retardancy in image formation apparatuses, such as copying machines, laser beam printers, and ink jet printers. Specifically, cases for accommodating photoconductors, members around fixing units, members around power supplies, and the like are mentioned.

Moreover, the molded body according to this embodiment can be used as cases insofar as the design is not affected. The case can also be referred to as an outer case.

Figure 1B:
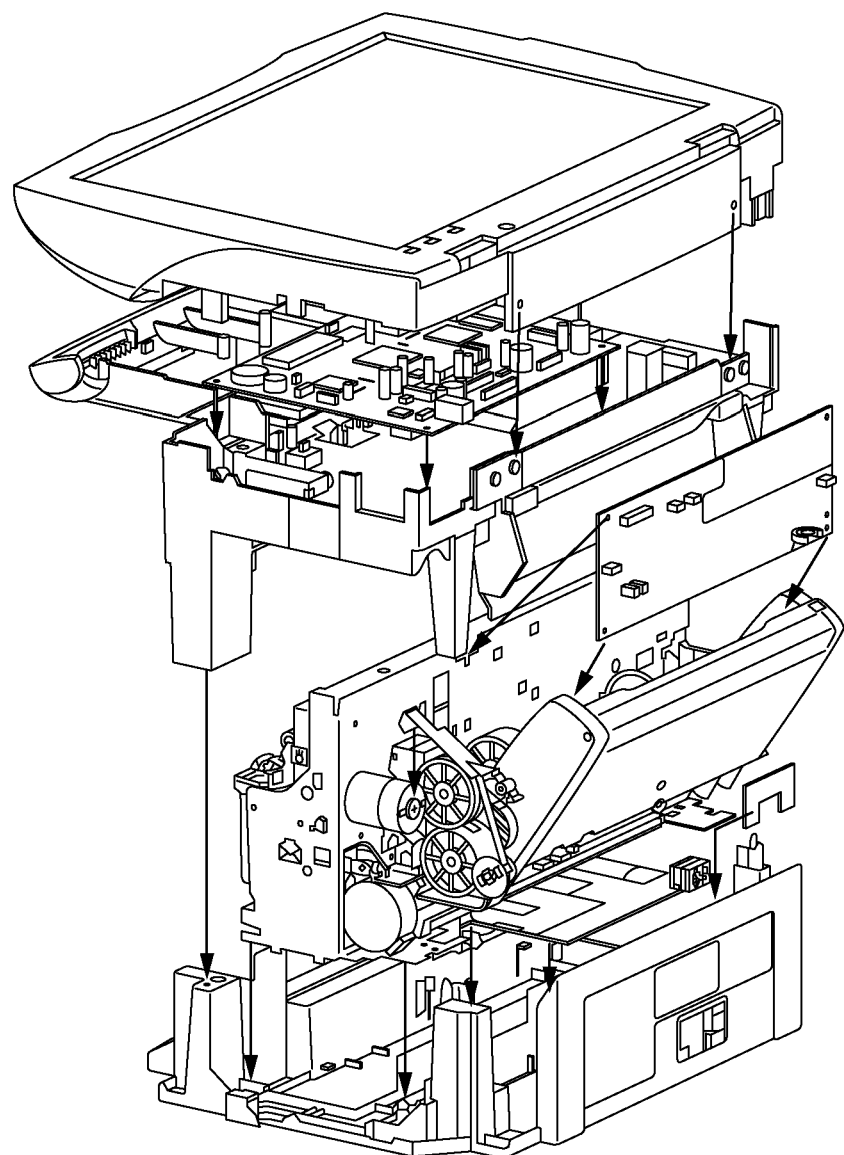
FIG. 1B illustrating a schematic view of an example of the image formation apparatus according to this embodiment.

The image formation apparatus according to this embodiment includes, for example, one illustrated in FIGS. 1A and 1B. FIG. 1A is an outside view of an example of the image formation apparatus. A case is illustrated in FIG. 1A. FIG. 1B is a schematic view illustrating the inside of an example of the image formation apparatus. Internal parts are illustrated in FIG. 1B.

EXAMPLES

Hereinafter, Examples of the present invention are described. The technical scope of the present invention is not limited thereto. The measurement and the evaluation were performed using the following methods and devices.

(1) Flame Retardancy
Test method: V test (20 mm vertical burning test) according to UL94 standard
Sample shape: Test piece for flame retardant test (125 mm×12.5 mm×t1.5 mm)
(2) Melting Point (Tm) Measurement and Glass Transition Temperature (Tg) Measurement
Device name: Differential scanning calorimetry produced by TA Instruments
Pan: Aluminum pan
Sample weight: 3 mg
Temperature elevation starting temperature: 30° C.
Temperature elevation rate: 10° C./min
Atmosphere: Nitrogen
(3) Thermal Decomposition Temperature (Td) Measurement
Device name: Thermogravimetric analyzer produced by TA Instruments
Pan: Platinum pan
Sample weight: 3 mg
Temperature elevation starting temperature: 30° C.
Measurement mode: Dynamic rate method*[1]
Atmosphere: Nitrogen
*[1] The dynamic rate method is a measurement mode in which the heating rate is controlled according to the degree of weight changes, and the resolution improves.

(Production Example 1) Synthesis of Flame Retardant

Guaiacol (470.8 g, 3.72 mol) dehydrated with $MgSO_4$ and phosphorus oxychloride (190.0 g, 1.23 mol) were weighed out into a 3 L separable flask, and then stirred with a mechanical starter in a nitrogen atmosphere. To the mixture, 1.5 L of THF (Moisture amount of 20 ppm or less) was added. Furthermore, triethylamine (486.6 g, 4.78 mol) was added thereto from a dropping funnel over 1.5 h.

The reaction was performed at an internal temperature of 60° C. for 18 h. The obtained reaction mixture was neutralized in an aqueous NaOH solution, and then the hydrochloride of the triethylamine was removed by filtration to obtain a light yellow filtrate. A reaction mixture obtained by condensing the filtrate by an evaporator was developed in 5 L of water, so that a white crystalline substance was obtained. The white crystalline substance was stirred and washed twice in 5 L of water with a mechanical stirrer over 12 h, filtered, and then vacuum-dried at 70° C. for 48 h, whereby a flame retardant compound was obtained with 93% yield.

The melting point (Tm) measured with a differential scanning calorimetry (DSC) of the flame retardant compound thus obtained was 99° C. and the 5% weight loss temperature (Td) measured with a thermogravimetric analyzer (TGA) thereof was 249° C. The results clarified that the flame retardant had heat characteristics which allow the flame retardant compound to sufficiently stand the temperature at which the polymer containing styrene or the aromatic polyester was kneaded.

Moreover, the structure was identified by $^1$H-NMR, the peak of protons of the hydroxyl group of the guaiacol disappeared.

The peaks of the protons of the benzene ring of guaiacol of δ=7.40 ppm, 7.42 ppm, δ=7.11 ppm, 7.13 ppm, and δ=6.87 ppm, 6.87, 6.89, 6.92, 6.94 were confirmed. The integral of the protons is defined as (a).

The peaks of the protons of a methoxy group of guaiacol of δ=3.76 ppm, 3.79 ppm were confirmed. The integral of the protons is defined as (b). From the fact that (a):(b)=4:3 was established, it was confirmed that the product is represented by Structural Formula (1).

(Production Example 2) Synthesis of polyethylene-2,5-furan dicarboxylate (PEF)

A 1 L four-necked flask having a nitrogen introduction tube, a fractionation tube-condenser tube, a thermometer, and a stainless-steel stirring blade was prepared. Into the four-necked flask, 2,5-furan dicarboxylic acid (2300 g) and ethylene glycol (2758 g, Molar ratio=1:3), a tin catalyst (0.05 wt %), and a titanium catalyst (0.05 wt %) dissolved with toluene were weighed out.

Stirring was started while introducing nitrogen into the four-necked flask, and then the flask was immersed in a 150° C. oil bath to increase the temperature of these contents. The outflow of by-product water started in connection with a condensation reaction started around the timing when the internal temperature reached 150° C., and then the temperature was increased to 230° C. over about 4 h.

The fractionation tube was changed to a distilling head, and then pressure reduction was started. A full vacuum (266 Pa) state was established over about 3 h, and thereafter the reaction was continued at 230° C. under reduced pressure (266 Pa) for about 14 h. The obtained polyethylene-2,5-furan dicarboxylate was 2375 g. The number average molecular weight (in terms of polymethyl methacrylate) was 70,000, Tm was 200° C., Tg was 85° C., the crystallization temperature was 156° C., and the 10% weight loss thermal decomposition temperature was 360° C.

Examples 1 to 10, Comparative Examples 1 to 8

ABS used in Examples and Comparative Examples was dried with hot air in a pellet state under the conditions: at 80° C. for 6 h or more. PEF used in Examples and Comparative Examples was dried with hot air in a pellet state under the conditions: at 120° C. for 8 h or more.

The materials shown in Tables 1 and 2 were weighed out in such a manner as to have a mass ratio shown in Tables 1 and 2, and then mixed. Thereafter, the mixture was melt and kneaded with a biaxial extruder (Laboplastomill, Trade name, produced by Toyo Seiki Seisakusho Co., Ltd.).

In Examples 1 to 3 and Comparative Examples 1 to 4, the kneading was performed at a cylinder temperature of 205° C. to 210° C. In Examples 4 to 7 and Comparative Examples 6 to 9, the kneading was performed at a cylinder temperature of 220° C. to 225° C.

In Comparative Example 8, the strand of the resin after kneaded is weak, so that the resin was not able to be pelletized. This is considered to be because the compatibility of PEF and phytin is poor. It was found that a flame retardant composition cannot be obtained by mixing phytin with PEF.

In Comparative Example 8, since a burning test piece was not able to be produced, the flame retardant test is not performed.

The obtained pellets were dried with hot air under the conditions: at 80° C. for 6 h or more, and then molded into a test piece for flame retardant test (125 mm×12.5 mm×t1.5 mm) using an injection molding machine (SE18DU, Trade name, produced by Sumitomo Heavy Industries, Ltd.). The molding temperature in this process was set as follows: a cylinder temperature of 210° C. to 235° C. and a mold temperature of 40° C. in Examples 1 to 3 and Comparative Examples 1 to 4 and a cylinder temperature of 200° C. to 220° C. and a mold temperature of 60° C. in Examples 4 to 7 and Comparative Examples 6 and 7, 9.

In Comparative Example 5 and Comparative Example 10, kneading was not performed, and test pieces were produced using an injection molding machine (SE18DU, Trade name, produced by Sumitomo Heavy Industries, Ltd.). In Comparative Example 5, a test piece for flame retardant test was produced under the conditions of a cylinder temperature of 210° C. to 235° C. and a mold temperature of 40° C. In Comparative Example 10, a test piece for flame retardant test (125 mm×12.5 mm×t1.5 mm) was molded under the conditions of a cylinder temperature of 230° C. to 245° C. and a mold temperature of 60° C.

As each material shown in Tables 1 and 2, the following materials were used.

ABS: GP35 (Grade Name), produced by Styrolution GmbH

PEF: one described in Production Example 2

Guaiacol phosphoric acid ester (A component): one described in Production Example 1

Tannic acid: produced by Kishida Chemical Co., Ltd.

Sodium laurate: produced by Kishida Chemical Co., Ltd.

Sucrose: produced by Kishida Chemical Co., Ltd.

Potassium hydrogen tartrate: produced by Kishida Chemical Co., Ltd.

Phytin: "Phytin (extract)" produced by Tsuno rice fine chemicals Co., Ltd.

The compounding ratios and the measurement results of the flame retardancy (V test) of Examples 1 to 7 were shown in Table 1. The compounding ratios and the measurement results of the flame retardancy (V test) of Comparative Examples 1 to 10 were shown in Table 2. The judging criteria of the V test (20 mm vertical burning test) of the UL94 standard were shown in Table 3.

TABLE 1

| | Ex. 1 | Ex. 2 | Ex. 3 | Ex. 4 | Ex. 5 | Ex. 6 | Ex. 7 |
|---|---|---|---|---|---|---|---|
| ABS | 90 | 88 | 85 | | | | |
| PEF | | | | 93 | 90 | 88 | 85 |
| Guaiacol phosphoric acid ester | 10 | 12 | 15 | 7 | 10 | 12 | 15 |
| UL94 Class | V-2 | V-2 | V-2 | V-0 | V-0 | V-0 | V-0 |

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| ABS | 99.45 | 90 | 90 | 95 | 100 | | | | | |
| PEF | | | | | | 99.45 | 90 | 90 | 95 | 100 |
| Guaiacol phosphoric acid ester | | | | 5 | | | | | 5 | |
| Tannic acid | 0.15 | | | | | 0.15 | | | | |
| Sucrose | 0.30 | | | | | 0.30 | | | | |
| Sodium laurate | 0.10 | | | | | 0.10 | | | | |
| Potassium hydrogen tartrate | | 10 | | | | | 10 | | | |
| Phytin | | | 10 | | | | | 10 | | |
| UL94 Class | NG | NG | NG | NG | NG | V-2 | NG | Molding cannot be performed due to brittle resin composition. Non-evaluated | V-2 | NG |

TABLE 3

| | V-0 | V-1 | V-2 |
|---|---|---|---|
| Burning time after first or second flame movement from each sample | 10 seconds or less | 30 seconds or less | 30 seconds or less |
| Total burning time after ten times of flame movement | 50 seconds or less | 250 seconds or less | 250 seconds or less |
| Total of burning time after second flame movement and glowing time | 30 seconds or less | 60 seconds or less | 60 seconds or less |
| Ignition of absorbent cotton due to drips | Not-occurred | Not-occurred | Occurred |

In Example 1 to Example 3 of Table 1, the flame retardancy equivalent to V-2 in the UL94 standard can be obtained and the flame retardancy of V-2 in the UL94 standard required in the polymer containing styrene when used for members of copying machines can be satisfied.

In Example 4 to Example 7 of Table 1, the flame retardancy equivalent to V-0 in the UL94 standard can be obtained and the flame retardancy of V-0 in the UL94 standard required in the aromatic polyester when used for members of copying machines can be satisfied.

More specifically, the flame retardant composition according to the present invention has flame retardancy higher than that of a composition containing a former flame retardant compound and can be suitably used for molded bodies, such as cases of copying machines.

On the other hand, Comparative Examples 1 to 5 of Table 2 did not pass the V test and the flame retardancy of V-2 in the UL94 standard required in the polymer containing styrene when used for members of copying machines cannot be satisfied. In Comparative Examples 6 to 10 of Table 2, the flame retardancy of V-0 in the UL94 standard required in the aromatic polyester when used for members of copying machines cannot be satisfied.

The present invention can provide a flame retardant composition having flame retardancy higher than that of a composition containing a former flame retardant compound.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A flame retardant composition comprising:
    a flame retardant compound represented by Formula (1); and
    acrylonitrile butadiene styrene (ABS) or polyalkylene furan dicarboxylate,
    wherein, in a case where the flame retardant composition includes the ABS, the content of the flame retardant compound is 10% to 15% by weight, and the content of the ABS is 85% to 90% by weight, when the total weight of the flame retardant composition is 100%, and
    wherein, in a case where the flame retardant composition includes the polyalkylene furan dicarboxylate, the content of the flame retardant compound is 7% to 15% by weight, and the content of the polyalkylene furan dicarboxylate is 85% to 93% by weight, when the total weight of the flame retardant composition is 100%,

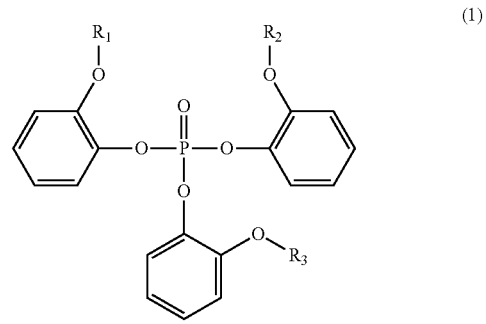

wherein, in Formula (1), $R_1$ to $R_3$ are methyl groups.

2. The flame retardant composition according to claim 1 comprising:
    the flame retardant compound and the polyalkylene furan dicarboxylate.

3. The flame retardant composition according to claim 2, wherein the polyalkylene furan dicarboxylate is polyethylene furan dicarboxylate.

4. The flame retardant composition according to claim 2, wherein a polymerization degree of the polyalkylene furan dicarboxylate is 185 or more and 600 or less.

5. The flame retardant composition according to claim 1 comprising:
the flame retardant compound and the ABS,
wherein the ABS is a polymer containing acrylonitrile, butadiene, and styrene as structural units.

6. The flame retardant composition according to claim 1, wherein the ABS or the polyalkylene furan dicarboxylate is a recovered resin.

7. A molded body, which is obtained by molding the flame retardant composition according to claim 1.

8. The molded body according to claim 7, wherein flame retardancy is V-2 or better in a V test in UL94 standard.

9. The molded body according to claim 8, wherein flame retardancy is V-0 in a V test in UL94 standard.

10. An electrophotographic image formation apparatus, comprising:
a light source; and
a photoconductor,
wherein the apparatus has a case for accommodating the photoconductor, and
the case is the molded body according to claim 7.

11. The flame retardant composition according to claim 1, wherein a total of the content of the ABS or polyalkylene furan dicarboxylate and the content of the flame retardant compound is 100 wt %.

12. A method for producing a flame retardant composition containing a flame retardant compound represented by Formula (1) and acrylonitrile butadiene styrene (ABS) or polyalkylene furan dicarboxylate,
wherein, in a case where the flame retardant composition includes the ABS, the addition amount of the flame retardant compound is 10% to 15% by weight, and the content of the ABS being 85% to 90% by weight, when the total weight of the flame retardant composition is 100%, and
wherein, in a case where the flame retardant composition includes the polyalkylene furan dicarboxylate, the addition amount of the flame retardant compound is 7% to 15% by weight, and the content of the polyalkylene furan dicarboxylate being 85% to 93% by weight, when the total weight of the flame retardant composition is 100%,

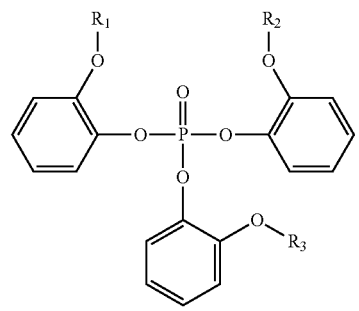

(1)

wherein, in Formula (1), $R_1$ to $R_3$ are methyl groups.

13. A method for producing a molded body, comprising:
preparing a flame retardant composition obtained by the method for producing a flame retardant composition according to claim 12; and then
molding the flame retardant composition.

14. The method for producing a molded body according to claim 13, wherein the molding is extrusion molding or injection molding.

15. The method for producing a flame retardant composition according to claim 12, wherein a total of the content of the ABS or polyalkylene furan dicarboxylate and the content of the flame retardant compound is 100 wt %.

16. A flame retardant composition comprising:
a flame retardant compound represented by Formula (1); and
polyalkylene furan dicarboxylate,
wherein a content of the flame retardant compound is 7% to 15% by weight when a total weight of the flame retardant composition is 100%, and
a content of the polyalkylene furan dicarboxylate is 85% to 93% by weight when the total weight of the flame retardant composition is 100%,

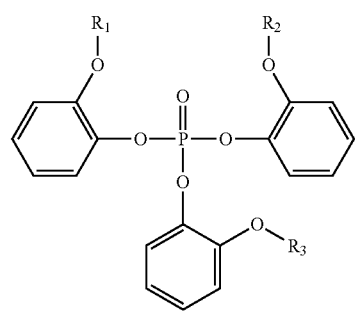

(1)

wherein, in Formula (1), $R_1$ to $R_3$ are methyl groups.

* * * * *